United States Patent [19]

Hirai et al.

[11] Patent Number: 4,855,355

[45] Date of Patent: Aug. 8, 1989

[54] MOLDING RESIN COMPOSITION

[75] Inventors: Mikio Hirai; Tokuo Tatsuda; Tomio Yoshida, all of Niihama, Japan

[73] Assignee: Sumitomo Naugatuck Co., Ltd., Osaka, Japan

[21] Appl. No.: 174,166

[22] Filed: Mar. 28, 1988

[30] Foreign Application Priority Data

Mar. 27, 1987 [JP] Japan .................................. 62-75462

[51] Int. Cl.$^4$ ....................... C08L 51/04; C08L 63/00
[52] U.S. Cl. ....................................... 525/64; 525/65; 525/66
[58] Field of Search ............................. 525/64, 65, 66

[56] References Cited

U.S. PATENT DOCUMENTS

| | | | |
|---|---|---|---|
| 4,373,063 | 2/1983 | Sakano et al. | ......................... 525/64 |
| 4,739,010 | 4/1988 | McKee et al. | ......................... 525/64 |

FOREIGN PATENT DOCUMENTS

| | | | |
|---|---|---|---|
| 0135677 | 4/1985 | European Pat. Off. | ............. 525/64 |
| 8604076 | 7/1986 | World Int. Prop. O. | ............ 525/64 |

*Primary Examiner*—Lewis T. Jacobs
*Assistant Examiner*—Susan Berman

[57] ABSTRACT

A molding resin composition comprising (A) a saturated polyester resin, (B) a graft copolymer and (C) a rubber-reinforced resin, wherein a weight ratio of the saturated polyester resin (A) to a total weight of the graft copolymer (B) and the rubber-reinforced resin (C) is from 95:5 to 5:95, a weight ratio of the graft copolymer (B) to the rubber-reinforced resin is from 100:0 to 5:95, and the graft copolymer (B) is one prepared by copolymerizing an unsaturated epoxide monomer and at least one monomer selected from the group consisting of aromatic vinyl monomers, cyanated vinyl monomers and alkyl unsaturated carboxylates in the presence of an ethylene-α-olefin base rubber, which can provide a molded article having improved impact strength, weld strength, stiffness and mold shrinkage factor.

7 Claims, No Drawings

MOLDING RESIN COMPOSITION

BACKGROUND OF THE INVENTION

1. Field of the Invention

The present invention relates to a molding resin composition. More particularly, it relates to a saturated polyester base molding resin composition which gives a molded article having improved impact resistance, weld strength, stiffness and mold shrinkage factor.

2. Description of the Related Art

Saturated polyester resins such as polybutylene terephthalate and polyethylene terephthalate have many good properties and are used as materials of, for example, electrical parts, machine parts, automobile parts and the like.

The saturated polyester resin has low notched impact strength and a larger molding shrinkage factor due to its crystallizing tendency. To overcome such defects of the saturated polyestr resin, many proposals have been made. For example, Japanese Patent Publication Nos. 30421/1972 and 25261/1976 disclose addition of an ABS resin to the saturated polyester resin, Japanese Patent Kokai Publication No. 117556/1982 discloses the addition of an AES resin to the saturated polyester resin, Japanese Patent Publication No. 47419/1983 discloses the addition of α-olefin/glycidyl methacrylate copolymer to the saturated polyester resin, Japanese Patent Kokai Publication Nos. 17148/1983 and 17151/1983 disclose the addition of ethylene/propylene base rubber and α-olefin/glycidyl methacrylate copolymer to the saturated polyester resin, and Japanese Patent Kokai Publication No. 168750/1985 discloses the use of epoxidized EPDM.

However, none of them can provide a satisfactory molding resin composition since a molded article produced from said composition has only slightly improved notched impact strength, small falling ball strength at a welded part where two or more portions of resin melts meet or intersect with each other in a mold, small stiffness such as tensile strength and flexural modulus, and a large molding shrinkage factor.

SUMMARY OF THE INVENTION

An object of the present invention is to provide a saturated polyester resin base molding resin composition which can improve the drawbacks of the above described conventional molding resin compositions.

According to the present invention, there is provided a molding resin composition comprising (A) a saturated polyester resin, (B) a graft copolymer and (C) a rubber-reinforced resin, wherein a weight ratio of the saturated polyester resin (A) to a total weight of the graft copolymer (B) and the rubber-reinforced resin (C) is from 95:5 to 5:95, a weight ratio of the graft copolymer (B) to the rubber-reinforced resin is from 100:0 to 5:95, and the graft copolymer (B) is one prepared by copolymerizing an unsaturated epoxide monomer and at least one monomer selected from the group consisting of aromatic vinyl monomers, cyanated vinyl monomers and alkyl unsaturated carboxylates in the presence of an ethylene-α-olefin base rubber. The molding resin composition of the present invention can provide a molded article having improved impact strength, weld strength, stiffness, molding shrinkage factor, etc.

DETAILED DESCRIPTION OF THE INVENTION

Examples of the saturated polyester resin (A) are polyethylene terephthalate, polytetramethylene terephthalate, polybutylene terephthalate, polyester-ether block copolymers comprising a hard segment of polyester and a soft segment of polyether. These may be prepared from, for example, 1,4-butanediol and terephthalic acid or dimethyl terephthalate and ethylene glycol.

The graft copolymer (B) is one prepared by copolymerizing an unsaturated epoxide monomer and at least one monomer selected from the group consisting of aromatic vinyl monomers, cyanated vinyl monomers and alkyl unsaturated carboxylates in the presence of an ethylene-α-olefin base rubber.

The ethylene-α-olefin base rubber includes a copolymer of ethylene with propylene or butene (EPR), a terpolymer of ethylene, propylene or butene and a non-conjugated diene (EPDM) and the like. These may be used independently or as a mixture. Examples of the non-conjugated diene contained in the terpolymer (EPDM) are dicyclopentadiene, ethylidenenorbornene, 1,4-hexadiene, 1,4-cyclobutadiene, 1,5-cyclooctadiene and the like.

In the copolymer (EPR) and the terpolymer (EPDM), a molar ratio of ethylene to propylene or butene is preferably from 5:1 to 1:3.

In the terpolymer (EPDM), the non-conjugated diene is contained in an amount corresponding to an iodine value of 2 to 50.

Specific examples of the aromatic vinyl compound are styrene, α-methylstyrene, α-chlorostyrene, p-tert.-butylstyrene, p-methylstyrene, o-chlorostyrene, p-chlorostyrene, 2,5-dichlorostyrene, 3,4-dichlorostyrene, p-bromostyrene, o-bromostyrene, 2,5-dibromostyrene, 3,4-dibromostyrene, cyanostyrene, 2-isopropenylnaphthalene, and mixtures thereof. Among them, styrene and α-methylstyrene are preferred.

Specific examples of the cyanated vinyl compound are acrylonitrile, methacrylonitrile, maleonitrile, fumaronitrile, and mixtures thereof. Among them, acrylonitrile is preferred.

Specific examples of the alkyl unsaturated carboxylate are methyl acrylate, ethyl acrylate, propyl acrylate, butyl acrylate, benzyl acrylate, hexyl acrylate, hydroxyethyl acrylate, hydroxypropyl acrylate, methyl methacrylate, ethyl methacrylate, propyl methacrylate, butyl methacrylate, benzyl methacrylate, hexyl methacrylate, hydroxyethyl methacrylate, hydroxypropyl methacrylate, and mixtures thereof. Among them, methyl methacrylate is preferred.

Although at least one monomer selected from the group consisting of aromatic monomers, cyanated vinyl monomers and alkyl unsaturated carboxylates is copolymerized with the unsaturated epoxide monomer in the presence of the ethylene-α-olefin base rubber, a combination of the aromatic vinyl monomer and the cyanated vinyl monomer is preferred.

The unsaturated epoxide monomer is a monomer having at least one unsaturated bond which can contribute to polymerization and at least one epoxy group in one molecule. Examples of such epoxide monomer are an unsaturated glycidyl ester of the formula:

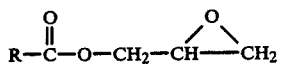

wherein R is a hydrocarbon group having a polymerizable ethylenically unsaturated bond, an unsaturated glycidyl ether of the formula:

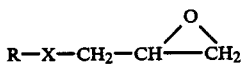

wherein

R is the same as defined in the formula (I), and X is a divalent group of the formula: —$CH_2$—O— or

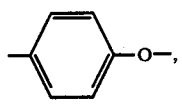

and an epoxyalkene of the formula:

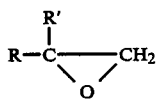

wherein R is the same as defined in the formula (I), and R' is hydrogen or methyl. Specific examples of these epoxide monomers are glycidyl acrylate, glycidyl methacrylate, mono- and di-glycidyl ester of itaconic acid, mono-, di- and triglycidyl ester of butenetricarboxylic acid, mono- and diglycidyl ester of citraconic acid, mono- and di-glycidyl ester of endo-cis-bicyclo[2.2.1]hept-5-ene-2,3-dicarboxylic acid (trade name: Nadic acid), mono- and di-glycidyl ester of endo-cis-bicyclo[2.2.1]hept-5-ene-2-methyl-2,3-dicarboxylic acid (trade name: Methylnadic acid), mono- and di-glycidyl ester of allylsuccinic acid, glycidyl ester of p-styrenecarboxylic acid, allylglycidyl ether, 2-methylallylglycidyl ether, styrene-p-glycidyl ether or p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, and the like.

The ratio of the ethylene-α-olefin base rubber to the monomers in the polymerization of the graft copolymer (B) is not critical. In view of physical properties of the produced resin composition, preferably, 10 to 2,000 parts by weight, particularly 20 to 1,000 parts by weight of at least one monomer selected from the group consisting of aromatic vinyl monomers, cyanated vinyl monomers and alkyl esters of unsaturated carboxylic acids and 0.1 to 100 parts by weight, particularly 0.1 to 50 parts by weight of the unsaturated epoxide monomer are used per 100 parts by weight of the rubber. When the amount of the unsaturated epoxide monomer is less than 0.1 parts by weight, improvement of impact resistance and weld strength of the molded article is insufficient. When the amount of the unsaturated epoxide monomer is larger than 50 parts by weight, processability of the molding resin composition tends to decrease.

As the graft copolymerization method, any of conventional methods such as emulsion, suspension, solution, emulsion-suspension and bulk-suspension polymerization may be employed.

The rubber-reinforced resin (C) may be a graft copolymer prepared by graft copolymerizing at least two monomers selected from the group consisting of aromatic vinyl monomers, cyanated vinyl monomers and other copolymerizable vinyl monomers on the rubber, or a mixture of such graft copolymer and a copolymer of at least two of the above monomers.

Specific examples of the rubber which constitutes the graft copolymer (C) are the ethylene-α-olefin base rubber explained in connection with the graft copolymer (B), diene rubbers (e.g. polybutadiene, styrene-butadiene copolymer, acrylonitrile-butadiene copolymer, etc.), acrylic rubbers (e.g. polybutyl acrylate, a copolymer comprising a $C_1$-$C_{16}$-alkyl acrylate, other copolymerizable compound such as an aromatic vinyl monomer and a cyanated vinyl monomer) and/or a cross-linking agent, and the like, chlorinated polyethylene, ethylene-vinyl acetate copolymer, and mixtures thereof. The aromatic vinyl monomer or the cyanated vinyl monomer which constitutes the rubber-reinforced resin are the same as used for preparing the graft copolymer (B). Other copolymerizable compounds include the alkyl unsaturated carboxylate explained in connection with the graft copolymer (B), unsaturated carboxylic acids (e.g. acrylic acid, maleic acid, fumaric acid, etc.) and their anhydride such as maleic anhydride, maleimides (e.g. maleimide, methylmaleimide, N-phenylmaleimide, etc.) and mixtures thereof. Among them, (meth)acrylate is preferred.

The content of the rubber in the rubber-reinforced resin (C) is not critical either. Preferably, it is from 5 to 60% by weight per whole weight of the rubber-reinforced resin. Further, the molar ratio of the monomers is not critical. Preferably, the aromatic vinyl monomer is from 50 to 80% by weight and the cyanated vinyl monomer and/or other vinyl compound are 20 to 50% by weight per total weight of all the monomers.

As the preparation method of the rubber-reinforced resin, any of conventional methods such as bulk, emulsion, suspension, solution, emulsion-suspension and bulk-suspension polymerization may be employed.

The molding resin composition of the present invention comprises the above described saturated polyester resin (A), the graft copolymer (B) and optionally the rubber-reinforced resin (C). The weight ratio of the saturated polyester resin (A) to the total weight of the graft copolymer (B) and the rubber-reinforced resin (C) [A:(B+C)] is from 95:5 to 5:95, and the weight ratio of the graft copolymer to the rubber-reinforced resin is from 100:0 to 5:95.

When the saturated polyester resin (A) is used in an amount larger than the above upper limit (95:5), the molded article has unsatisfactory impact resistance, and when the saturated polyester resin (A) is used in an amount smaller than the above lower limit (5:95), the molded resin has decreased solvent resistance. When the graft copolymer is used in an amount less than the above lower limit (B:C=5:95), the molded article has insufficient weld strength.

In view of the properly balance (notched Izod impact strength, weld strength, flexural modulus and molding shrinkage factor) and the solvent resistance of the produced resin, the weight ratio of the saturated polyester resin (A) to the total weight of the graft copolymer and the rubber-reinforced resin (C) [A:(B+C)] is from 90:10 to 20:80.

There is no limitation on the method and sequence of mixing these components of the molding resin composition of the present invention. The components can be mixed by a per se conventional mixing apparatus.

The molding resin composition of the present invention may contain a conventionally used additives such as a dye, a pigment, a stabilizer, a plasticizer, an antistatic agent, an ultraviolet light absorbing agent, a lubricant, a filler and the like.

PREFERRED EMBODIMENTS OF THE INVENTION

The present invention will be illustrated by following examples, in which "parts" and "%" are by weight unless otherwise indicated.

EXAMPLES 1-9 AND COMPARATIVE EXAMPLES 1-11

A saturated polyester resin, a graft copolymer, a rubber-reinforced resin or a known modifier for the saturated polyester resin were compounded in a ratio shown in Table 1 or 2 by a twin-screw extruder to prepare each molding resin composition.

Then, from the composition, a test piece was molded by an injection molding machine.

The used components are as follows:

SATURATED POLYESTER RESIN

Polybutylene terephthalate ("Toughpet N-1000", trade name of Mitsubishi Rayon)

GRAFT COPOLYMER (B)

(1) B-1

A graft copolymer was prepared as follows:

To a solution of EPDM containing 50% of propylene and ethylidenenorobornene as a diene component (Iodine value of 15.3, Mooney viscosity of 67) (240 parts) in a mixed solvent of n-hexane (3,000 parts) and ethylene dichloride (2,000 parts), glycidyl methacrylate (2.4 parts), acrylonitrile (80 parts), styrene (240 parts) and benzoyl peroxide (8 parts) were added and polymerized at 67° C. for 10 hours in a nitrogen atmosphere. The polymer liquid was poured in a large excess amount of methanol to precipitate the product, which was separated and dried to obtain a graft copolymer.

(2) B-2

In the same manner as in the preparation of the graft copolymer B-1 but using 24 parts of glycidyl methacrylate, a graft copolymer was prepared.

(3) B-3

In the same manner as in the preparation of the graft copolymer B-2 but using 70 parts of EPDM and 3.5 parts of glycidyl methacrylate, a graft copolymer was prepared.

RUBBER-REINFORCED RESIN (1) C-1

A rubber-reinforced resin was prepared as follows:

To a mixture of polybutadiene (gel content, 90%) (50 parts, as the solid material), potassium persulfate (0.5 part), potassium oleate (0.5 part) and dodecylmercaptan (0.3 part), styrene (36 parts) and acrylonitrile (14 parts) were added and polymerized at 70° C. for 3 hours followed by aging for 1 (one) hour. The product was salted out, dehydrated and dried to obtain a rubber-reinforced resin having a particle size of 0.3 to 0.4 μm).

(2) C-2

A mixture of the rubber-reinforced resin C-1 and acrylonitrile/styrene copolymer in a weight ratio of 40:60.

(3) C-3

To a solution of EPDM containing 50% of propylene and ethylidenenorbornene as a diene component (Iodine value of 15.3, Mooney viscosity of 67) (240 parts) in a mixed solvent of n-hexane (3,000 parts) and ethylene dichloride (2,000 parts), acrylonitrile (80 parts), styrene (240 parts) and benzoyl peroxide (8 parts) were added and polymerized at 67° C. for 10 hours in a nitrogen atmosphere. The polymer liquid was poured in a large excess amount of methanol to precipitate the product, which was separated and dried to obtain a rubber-reinforced resin.

(4) C-4

In the same manner as in the preparation of the rubber-reinforced resin C-3 but using 70 parts of EPDM, a rubber-reinforced resin was prepared.

ETHYLENE-PROPYLENE BASE RUBBER

Espren-505 (manufactured by Sumitomo Chemical Co., Ltd.)

OLEFIN-GLYCIDYL METHACRYLATE COPOLYMER

A copolymer of 90 parts of ethylene and 10 parts of glycidyl methacrylate

EPOXIDIZED EPDM

According to U.S. Pat. No. 3,155,638, peroxy acid and EPDM were reacted to obtain epoxidized EPDM.

The measurement of weld strength was carried out as follows:

By using a mold having two gates (each 2.5 mm×2.0 mm) with a distance of 100 mm, a resin melt (250 to 310° C.) was injected to mold a test piece (150 mm×150 mm×3 mm). The test piece was placed on a jig having a height of 80 mm, an inner diameter of 120 mm and an outer diameter of 126 mm.

In a thermostatic room kept at 23° C., a steel ball of 1 kg was fallen onto a center part (welded part). The results are expressed in terms of maximum energy (kg·cm) with which the test piece is not broken.

The results are shown in Tables 1 and 2.

TABLE 1

| | \multicolumn{9}{c}{Example No.} | | | | | | | | |
|---|---|---|---|---|---|---|---|---|---|
| | 1 | 2 | 3 | 4 | 5 | 6 | 7 | 8 | 9 |
| Composition | | | | | | | | | |
| Saturated polyester resin (A) | 90 | 70 | 70 | 70 | 50 | 50 | 50 | 20 | 20 |
| Graft copolymer (B) | | | | | | | | | |
| B-1 | 10 | 30 | 5 | 5 | | | | | |
| B-2 | | | | | | 5 | | | 5 |
| B-3 | | | | | 50 | | 10 | 80 | |
| Rubber-reinforced resin (C) | | | | | | | | | |
| C-1 | | | 25 | | | | | | |

TABLE 1-continued

| | Example No. | | | | | | | | |
|---|---|---|---|---|---|---|---|---|---|
| | 1 | 2 | 3 | 4 | 5 | 6 | 7 | 8 | 9 |
| C-2 | | | | | | | | | |
| C-3 | | | | 25 | | | | | |
| C-4 | | | | | | 45 | 40 | | 75 |
| Notched Izod impact strength ¼", 23° C. (kg·cm/cm) | 27.2 | 69.8 | 43.7 | 45.2 | 48.3 | 32.1 | 35.2 | 35.3 | 28.7 |
| Weld strength (kg/cm) (falling bass impact test) | 670 | 620 | 530 | 510 | 450 | 430 | 405 | 370 | 380 |
| Flexural modulus (× 10⁴ kg/cm) | 2.20 | 2.02 | 1.98 | 2.00 | 2.12 | 2.08 | 2.15 | 2.08 | 2.06 |
| Molding shrinkage factor (%) | 0.9 | 0.8 | 0.9 | 0.9 | 0.7 | 0.7 | 0.8 | 0.6 | 0.6 |

TABLE 2

| | Comparative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Composition | | | | | | | | | | | |
| Saturated polyester resin (A) | 100 | 98 | 70 | 70 | 70 | 70 | 50 | 80 | 70 | 70 | 80 |
| Graft copolymer B-1 | | 2 | | | | 1 | | | | | |
| Rubber-reinforced resin (C) | | | | | | | | | | | |
| C-1 | | | 30 | | | | | | | | |
| C-2 | | | | 30 | | | | | | | |
| C-3 | | | | | 30 | 29 | | | | | |
| C-4 | | | | | | | 50 | | | 15 | |
| Ethylene-propylene base rubber | | | | | | | | 10 | | | |
| Olefin-glycidyl methacrylate copolymer | | | | | | | | 10 | 30 | 15 | |
| Epoxidized EPDM | | | | | | | | | | | 20 |
| Notched Izod impact strength ¼", 23° C. (kg·cm/cm) | 3.6 | 4.3 | 12.5 | 8.7 | 11.7 | 13.2 | 26.3 | 8.8 | 11.9 | 23.1 | 5.4 |
| Weld strength (kg/cm) (falling bass impact test) | 690 | 685 | 105 | 90 | 110 | 125 | 65 | 50 | 100 | 250 | 30 |
| Flexural modulus (× 10⁴ kg/cm) | 2.25 | 2.24 | 1.68 | 1.98 | 1.72 | 1.73 | 2.00 | 1.54 | 1.58 | 1.73 | 1.82 |
| Molding shrinkage factor (%) | 2.4 | 1.9 | 1.1 | 0.9 | 0.9 | 0.8 | 0.9 | 2.1 | 2.6 | 1.4 | 1.9 |

What is claimed is:

1. A molding resin composition comprising (A) a saturated polyester resin, (B) a graft copolymer and (C) a rubber-reinforced resin, wherein the weight ratio of the saturated polyester resin (A) to the total weight of the graft copolymer (B) and the rubber-reinforced resin (C) is from 95:5 to 5:95, the weight ratio of the graft copolymer (B) to the rubber-reinforced resin (C) is from 100:0 to 5:95, and the graft copolymer (B) is one prepared by copolymerizing an unsaturated epoxide monomer and a combination of an aromatic vinyl monomer and a cyanated vinyl monomer in the presence of an ethylene α-olefin base rubber.

2. The molding resin composition according to claim 1, wherein the ethylene-α-olefin base rubber is one selected from the group consisting of a copolymer of ethylene with propylene or butene and a terpolymer of ethylene, propylene or butene and a non-conjugated diene.

3. The molding resin composition according to claim 1, wherein the aromatic vinyl monomer which constitutes the graft copolymer (B) is styrene or α-methylstyrene.

4. The molding resin composition according to claim 1, wherein the cyanated vinyl compound is acrylonitrile.

5. The molding resin composition according to claim 1, wherein the unsaturated epoxide monomer is one selected from the group consisting of an unsaturated glycidyl ester of the formula:

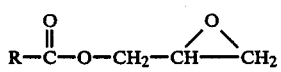

(I)

wherein R is a hydrocarbon group having a polymerizable ethylenically unsaturated bond, an unsaturated glycidyl ether of the formula:

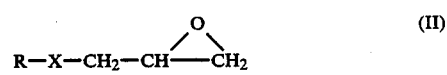

(II)

wherein R is the same as defined in the formula (I), and X is a divalent group of the formula: —CH₂—O— or

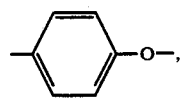

and an epoxyalkene of the formula:

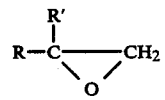

wherein R is the same as defined in the formula (I), and R' is hydrogen or methyl.

6. The molding resin composition according to claim 1 wherein the graft copolymer (B) is one prepared by copolymerizing glycidyl methacrylate and a combination of styrene and acrylonitrile in the presence of an ethylene-α-olefin base rubber which is a terpolymer of ethylene, propylene or butene and a non-conjugated diene.

7. The molding resin composition according to claim 6 wherein the saturated polyester resin (A) is polybutylene terephthalate.